US011469991B1

United States Patent
Mahadevan et al.

(10) Patent No.: US 11,469,991 B1
(45) Date of Patent: Oct. 11, 2022

(54) MODIFIED DESIGNATED FORWARDER ELECTION PROCESS FOR NON-OVERLAPPING BROADCAST DOMAINS

(71) Applicant: Arista Networks, Inc., Santa Clara, CA (US)

(72) Inventors: Vijay Mahadevan, Santa Clara, CA (US); Rajesh Semwal, Sunnyvale, CA (US); Prashant Srinivas, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/235,269

(22) Filed: Apr. 20, 2021

(51) Int. Cl.
| | | |
|---|---|---|
| *H04L 45/16* | (2022.01) | |
| *H04L 45/00* | (2022.01) | |
| *H04L 45/24* | (2022.01) | |
| *H04L 45/586* | (2022.01) | |
| *H04L 45/02* | (2022.01) | |

(52) U.S. Cl.
CPC .............. *H04L 45/24* (2013.01); *H04L 45/04* (2013.01); *H04L 45/16* (2013.01); *H04L 45/586* (2013.01); *H04L 45/66* (2013.01)

(58) Field of Classification Search
CPC ......... H04L 45/24; H04L 45/04; H04L 45/16; H04L 45/586; H04L 45/66
See application file for complete search history.

(56) References Cited

U.S. PATENT DOCUMENTS

| | | | | |
|---|---|---|---|---|
| 9,735,983 | B1* | 8/2017 | Sharma | H04L 12/4675 |
| 9,832,097 | B2* | 11/2017 | Balus | H04L 45/00 |
| 10,666,459 | B1* | 5/2020 | Sajassi | H04L 12/4641 |
| 2013/0201986 | A1* | 8/2013 | Sajassi | H04L 61/2069 |
| | | | | 370/390 |
| 2016/0261487 | A1* | 9/2016 | Singh | H04L 45/70 |
| 2017/0141963 | A1* | 5/2017 | Chalapathy | H04L 45/50 |
| 2021/0092045 | A1* | 3/2021 | Nagarajan | H04L 45/66 |
| 2021/0320818 | A1* | 10/2021 | Sreenivasagaperumal | ................ |
| | | | | H04L 12/4645 |

(Continued)

OTHER PUBLICATIONS

Wikipedia, Ethernet VPN. (Year: 2021).*

(Continued)

*Primary Examiner* — Alina A Boutah
(74) *Attorney, Agent, or Firm* — Fountainhead Law Group P.C.

(57) ABSTRACT

Embodiments described herein relate to techniques for designated forwarder (DF) elections, which may include: obtaining DF candidates that are part of a supplementary broadcast domain (SBD), wherein the DF candidate is one of the plurality of DF candidates for the SBD; performing a SBD DF election process to determine an SBD DF winner from among the DF candidates; making a first determination that the DF candidate is not the SBD DF winner; making second determination that a first broadcast domain (BD) provisioned on the DF candidate is not provisioned on the SBD DF winner; excluding the first BD from a set of BDs that are also provisioned on the SBD DF winner; performing additional DF election processes for each BD of the set of BDs; and processing multicast traffic based at least in part on the SBD DF election process and the additional DF election processes.

20 Claims, 3 Drawing Sheets

(56) References Cited

U.S. PATENT DOCUMENTS

2021/0352007 A1* 11/2021 Boutros .................. H04L 45/34
2022/0029890 A1* 1/2022 Mohanty ............. H04L 12/4641

OTHER PUBLICATIONS

Sajassi et al., "BGP MPLS-Based Ethernet VPN," Internet Engineering Task Force (IETF) Request for Comments: 7432, Feb. 2015. (Year: 2015).*
Sajassi et al., "A Network Virtualization Overlay Solution Using Ethernet VPN (EVPN)," Internet Engineering Task Force (IETF) Request for Comments: 8365, Mar. 2018. (Year: 2018).*
Sajassi et al, "Ethernet-Tree (E-Tree) Support in Ethernet VPN (EVPN) and Provider Backbone Bridging EVPN (PBB-EVPN)," Internet Engineering Task Force (IETF) Request for Comments: 8317, (Year: 2018).*
Sajassi et al., "Requirements for Ethernet VPN (EVPN)," Internet Engineering Task Force (IETF) Request for Comments: 7209, May 2014. (Year: 2014).*
Rabadan et al. "Framework for EVPN Designated Forwarder Election Extensibility," draft-ietf-bess-evpn-df-election-framework-03, BESS Workgroup Internet Draft, May 24, 2018. (Year: 2018).*
Mohanty et al., "A new Designated Forwarder Election for the EVPN," draft-ietf-bess-evpn-df-election-03, BESS Workgroup Internet Draft, Oct. 10, 2017. (Year: 2017).*
Lin et al., "EVPN Inter-subnet Multicast Forwarding," draft-lin-bess-evpn-irb-mcast-03, BESS Workgroup Internet Draft, Mar. 13, 2017. (Year: 2017).*
Lin et al. "Section 5.1 of the EVPN Optimized Inter-Subnet Multicast (OISM) Standard Internet", draft-lin-bess-evpn-irb-mcast-04; <https://datatracker.ietf.org/doc/html/draft-lin-bess-evpn-irb-mcast#section-5>, Internet Draft, Oct. 24, 2017 (Expires Apr. 27, 2018).

* cited by examiner

MODIFIED DESIGNATED FORWARDER ELECTION PROCESS FOR NON-OVERLAPPING BROADCAST DOMAINS

BACKGROUND

In an Ethernet virtual private network (EVPN) tenant domain, there may exist any number of broadcast domains (BDs), each connected to any number of provider edge (PE) routers of an EVPN instance (EVI). Some number of the PEs may be multicast external gateways (e.g., a protocol independent multicast (PIM) external gateway (PEG)), connecting the EVPN tenant domain to an external multicast domain. Each PE in a tenant domain must be provisioned with a supplementary broadcast domain (SBD). For each BD, and for the SBD, a DF election process occurs using an algorithm described in Section 5.1 of the EVPN Optimized Inter-Subnet Multicast (OISM) Standard Internet Draft version 4 (Apr. 27, 2018). Each PE that is also an external gateway (e.g., a PEG designated router (PEG DR)) executes the DF election algorithm (which may also be referred to as a PEG-DR election algorithm) for each BD for which it is provisioned, and also for the SBD. It is possible that BDs provisioned on the PEs may be non-overlapping, meaning there may be a different set of BDs provisioned on different PEs. Such a scenario may cause multiple copies of multicast traffic (e.g., PIM register messages) to be sent to the external multicast domain.

DETAILED DESCRIPTION

Figure 1:
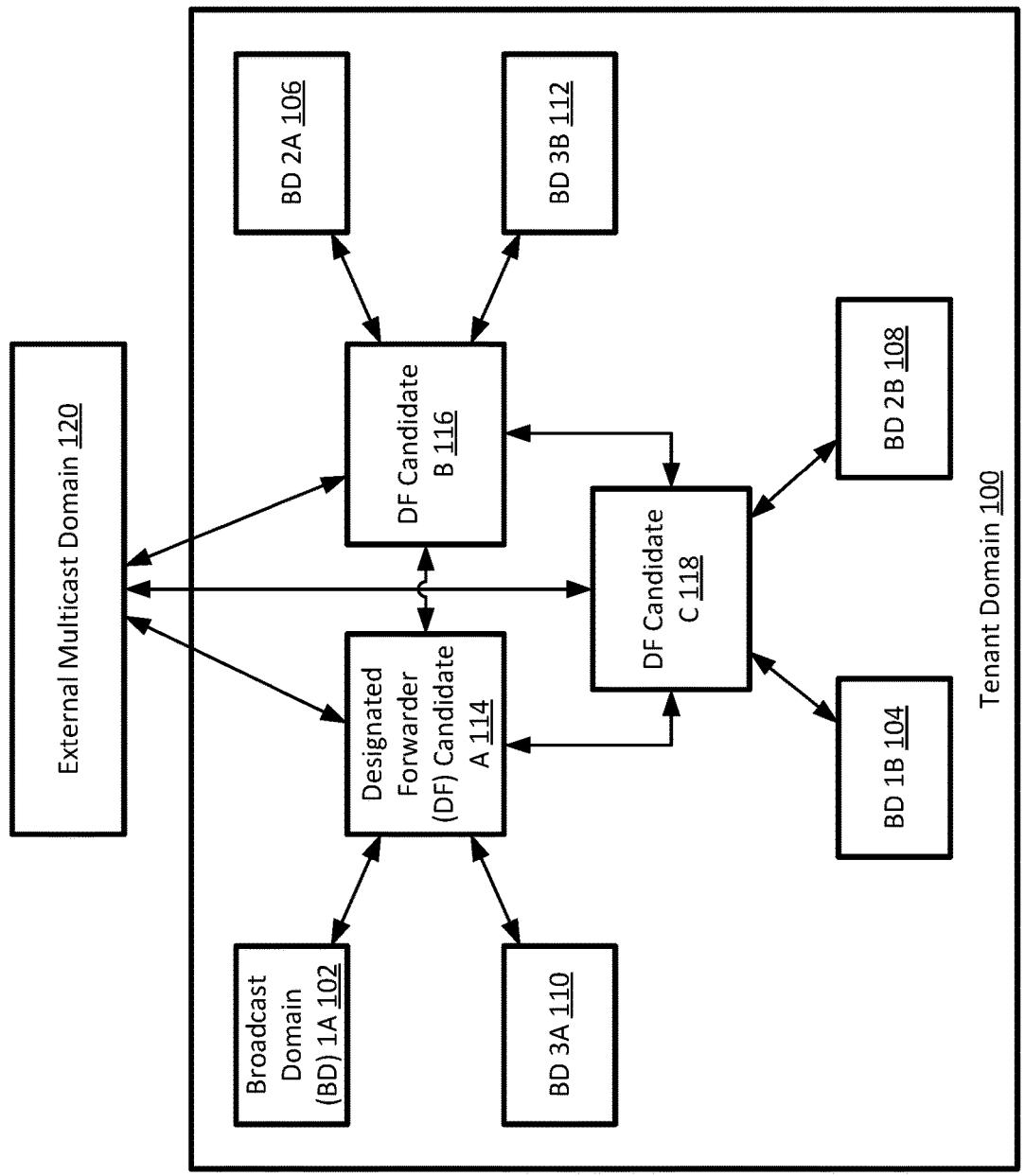
FIG. 1 shows a system in accordance with one or more embodiments described herein.

Specific embodiments will now be described with reference to the accompanying figures.

In general, embodiments described herein relate to techniques for modifying the designated forwarder (DF) election process for provider edge (PE) network devices within an Ethernet virtual private network (EVPN) tenant domain implementing EVPN Optimized Inter-Subnet Multicast (OISM), which may be used, for example, to elect a PEG-DR. Specifically, in one or more embodiments, the DF election process (i.e., the PEG-DR election process) is modified to avoid the potential sending of multiple copies of multicast traffic (e.g., PIM register messages) to one or more devices in external multicast domains operatively connected to the tenant domain (i.e., a double delivery problem). Currently, each PE network device in an EVPN tenant domain executes a DF election process for each BD for which it provisioned to determine a DF winner for the BD, resulting in one DF per BD. Similarly, each PE network device provisioned with the supplementary broadcast domain (SBD) of the EVPN tenant domain executes a DF election process to determine the DF winner for the SBD. However, in scenarios where BDs exist for which the SBD winner is not provisioned, the SBD winner and the DF winner for the BD that the SBD winner does not have may both transmit multicast traffic (e.g., PIM register messages) from the EVPN tenant domain to the same recipients, which is the aforementioned double delivery problem. Thus, the double delivery problem existing in the current EVPN OISM DF election process manifests as a result of PE network devices that are provisioned with different sets of broadcast domains (BDs). Embodiments disclosed herein solve this problem.

More specifically, in one or more embodiments, each provider edge device of the tenant domain that is an external multicast gateway obtains information for each other such PE provisioned with the SBD of the tenant domain (and itself), and executes the DF election algorithm to determine the SBD DF winner. In one or more embodiments, for each PE that is not the SBD DF winner, the PE then determines which BDs it does not share with the SBD DF winner. In one or more embodiments, those BDs (if there are any) are then excluded from additional DF election processes (i.e., the DF election process is not executed for those BDs). In one or more embodiments, for each BD that a given PE does have in common with the SBD DF winner, the PE performs the DF election process.

In one or more embodiments, this updated PEG-DR election process, in which PEG-DR candidates exclude BDs for which they are provisioned, but for which the SBD PEG-DR is not, from PEG-DR elections, results in one PE being the PEG-DR for any given BD that a PE has in common with the SBD PEG-DR, and the SBD PEG-DR winner being the one PEG-DR for any BD that it is not provisioned for, but that one or more other PEs are provisioned for. Therefore, in one or more embodiments, the potential for duplicate multicast traffic (e.g., PIM register messages) from within an EVPN tenant domain being transmitted to an external multicast tenant domain is eliminated.

FIG. 1 shows a system in accordance with one or more embodiments described herein. As shown in FIG. 1, the system includes external multicast domain (120) and tenant domain (100). The tenant domain (100) may include any number of broadcast domains (BDs) (e.g., BD 1A (102), BD 1B (104), BD 2A (106), BD 2B (108), BD 3A (110), and BD 3B (112)). The tenant domain (100) may also include any number of designated forwarder (DF) candidates (e.g., DF candidate (114), DF candidate (116), and DF candidate (118)). Each of these components is described below.

In one or more embodiments, tenant domain (100) is a set of devices configured to implement Ethernet virtual private network (EVPN) and are organized into two or more BDs. In one or more embodiments, EVPN is a control plane for bridging and routing virtual private networks (VPNs). In one or more embodiments, a BD is an emulated Ethernet, such that any two systems on the same BD will receive each other's link-local broadcasts. In one or more embodiments, a given tenant of an EVPN environment may have any number of BDs. In one or more embodiments, if the tenant so desires, the BDs may be configured such that communication may occur between the devices and systems of the various BDs. In one or more embodiments, the collection of BDs so configured for a given tenant may be referred to as a tenant domain (e.g., tenant domain (100)). In one or more embodiments, a tenant domain (e.g., tenant domain (100)) is configured with a supplementary broadcast domain (SBD) in addition to the other BDs of the tenant domain. In one or more embodiments, an SBD is a BD that is provisioned on each provider edge in an EVPN tenant domain, but that does not have any attachment circuits (ACs), and may be used to provide connectivity among all the Internet Protocol (IP) virtual routing functions (VRFs) of a given tenant domain.

As shown in FIG. 1, tenant domain (100) includes three BDs. In one or more embodiments, BD 1 includes segments BD 1A (102) and BD 1B (104). In one or more embodiments, BD 2 includes segments BD 2A (106) and BD 2B (108). In one or more embodiments, BD 3 includes segments BD 3A (110) and BD 3B (112). In one or more embodiments, the A and B designations represent different segments of a given BD, and signify that although the devices (e.g., of BD 1A (102) and BD 1B (104)) are all configured as part of the same BD, they have intervening devices, such as DFs (described below) between them that facilitate, at least in part, communication between the BD segments.

In one or more embodiments, each BD segment (BD 1A (102), BD 1B (104), BD 2A (106), BD 2B (108), BD 3A (110), BD 3B (112)) includes, but is not limited to, any number of network devices. In one or more embodiments, a network device is a device that includes and/or is operatively connected to persistent storage (not shown), memory (e.g., random access memory (RAM)) (not shown), one or more processor(s) (e.g., integrated circuits) (not shown), and at least one physical network interface (not shown) (which may also be referred to as a port), which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the scope of embodiments described herein. In one or more embodiments, a network device is a virtual instance of a network device. Such a network device may, for example, be a virtual instance of a router that executes within a hypervisor that is itself executing using underlying physical hardware.

In one or more embodiments, a network device includes any software configured to perform various functions of the network device (e.g., to implement EVPN). Such software may, for example, execute using one or more processors of a network device, or any other hardware resource of a network device capable of executing software.

Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the network interfaces (i.e., ports) of a network device and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Such a series of lookups and corresponding actions may be referred to as a pipeline, and may be, for example, programmed as a match-action pipeline. Examples of pipeline processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device.

In one or more embodiments, the network device is part of a network. A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, a network may be coupled with or overlap, at least in part, with the Internet. In one or more embodiments, a network includes a collection of one or more devices (e.g., network devices) that facilitate network connectivity for one or more operatively connected devices (e.g., computing devices, data storage devices, other network devices, etc.) (not shown). In one or more embodiments, a network device and other devices within the network are arranged in a network topology (not shown). In one or more embodiments, a network topology is an arrangement of various devices of a network.

In one or more embodiments, the persistent storage and/or memory of a network device may be or include one or more data repositories for storing any number of data structures storing any amount of data (i.e., information). In one or more embodiments, a data repository is any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one or more embodiments, the persistent storage and/or memory of a network device may be considered, in whole or in part, as non-transitory computer readable mediums storing, at least in part, software and/or firmware.

Such software and/or firmware may include instructions which, when executed by the one or more processors (not shown) or other hardware (e.g. circuitry) of a network device, cause the one or more processors and/or other hardware components to perform operations in accordance with one or more embodiments described herein.

Such software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

In one or more embodiments, each BD segment (BD 1A (102), BD 1B (104), BD 2A (106), BD 2B (108), BD 3A (110), BD 3B (112)) is operatively connected to at least one DF. For example, in the exemplary configuration shown in FIG. 1, BD 1A (102) and BD 3A (110) are operatively connected to DF candidate A (114), BD 2A (106) and BD 3B (112) are operatively connected to DF candidate B (116), and BD 1B (104) and BD 2B (108) are operatively connected to DF candidate C (118). In one or more embodiments, each DF (114, 116, 118) may also be operatively connected to other DFs, thereby providing operative connections between various BD segments.

In one or more embodiments, each DF candidate (114, 116, 118) is a network device (described above). In one or more embodiments, a DF in networks implementing EVPN is the provider edge (PE) router responsible for sending broadcast, unknown unicast and multicast (BUM) traffic for a BD. In one or more embodiments, a DF that is also connected to an external multicast domain (e.g., external multicast domain (120)) (described below) may also be referred to as an external gateway for the tenant domain (e.g., tenant domain (100)). As such, in one or more embodiments, DF A (114), DF B (116), and DF C (118), each of which are operatively connected to external multicast domain (120), are external gateways. In one or more embodiments, external gateways include functionality to transmit multicast traffic (e.g., PIM register messages) to one or more devices of an external multicast domain on behalf of a given BD.

In one or more embodiments, each DF (114, 116, 118) is provisioned with any number of BDs to which it has an operative connection, as well as an SBD (described above). In one or more embodiments, for each BD, and for the SBD, of a tenant domain (e.g., tenant domain (100)), a DF is elected.

In one or more embodiments, an external gateway that is elected as a DF (e.g., a PEG-DR) for a given BD is responsible for transmitting multicast traffic (e.g., PIM register messages) to an external multicast domain (120) on behalf of the BD for which it won the election process. Section 5.1 of the EVPN-OISM Standard Internet Draft version 4 (Apr. 27, 2018) describes one example of a DF election process. In one or more embodiments, a DF election process is any process by which a DF is elected from among a set of DF candidates for a given BD, and may be based on any set of information relating to a DF (e.g., based on execution of any algorithm (e.g., modulus, preference, etc.) using any information related to a PEG-DR). For example, for each DF candidate for a given BD, or the SBD, a tuple may be formed of a virtual local area network (VLAN) identifier (VLAN ID) that represents the BD, the IP address of the DF candidate, and an Ethernet segment identifier (ESI). In such an example, to perform the DF election for the BD, each DF candidate has the tuple for each other DF candidate and itself, and performs a hash function on the tuple, with the DF candidate having the highest value being elected as the DF for that BD. In one or more embodiments, each DF candidate for a BD receives information in any format using any protocol capable of sharing BD information from each other DF candidate for the BD. As such, in one or more embodiments, a given DF candidate has the tuples for itself and all other DF candidates for each BD for which it is provisioned, and for the SBD of the tenant domain (e.g., tenant domain (100)). In one or more embodiments, each DF candidate executes the same DF election process using the same tuples for each BD for which it is provisioned, and for the SBD.

However, the above-described DF election process, as contemplated in the EVPN-OISM Standard, may result in double delivery of multicast traffic (e.g., PIM register messages) to devices external to tenant domain (100) (e.g., devices in external multicast domain (120)). The problem may manifest, for example, when DFs in a tenant domain are configured with different BDs, which is when the set of BDs provisioned on the various DFs are not the exact same set. BDs that are not provisioned on all DFs may be referred to as non-overlapping BDs. In the case of non-overlapping BDs, a situation may arise where one DF candidate is elected as the DF for the SBD of the tenant domain, and another DF candidate is elected as the DF for a BD for which the SBD DF winner is not provisioned. Such a situation may result in the SBD DF winner, and the DF winner for the non-overlapping BD both transmitting multicast traffic (e.g., PIM register messages) to an external multicast domain (e.g., external multicast domain (120)). Embodiments described herein may use a modified DF election process that avoids the double delivery problem, which is discussed further in the description of FIG. 2, below.

In one or more embodiments, external multicast domain (120) is a collection of any number of devices organized in any way that are operatively connected to tenant domain (100), and that are configured to receive multicast traffic (e.g., PIM register messages) from within tenant domain (100) (i.e., from one or more BDs of tenant domain (100)). In one or more embodiments, at least a portion of the devices in external multicast domain (120) are network devices (described above). As an example, external multicast domain (120) may be a Protocol Independent Multicast (PIM) domain, and may include a rendezvous point (RP) network device configured to receive multicast traffic (e.g., PIM register messages) originating from tenant domain (100).

While FIG. 1 shows a configuration of components, other configurations may be used without departing from the scope of embodiments described herein. For example, a tenant domain may have any number of BDs, each with any number of BD segments. As another example, a tenant domain may have any number of DFs. As another example, some portion of the DFs of a tenant domain may not be operatively connected to an external multicast domain. Accordingly, embodiments disclosed herein should not be limited to the configuration of devices and components shown in FIG. 1.

Figure 2:
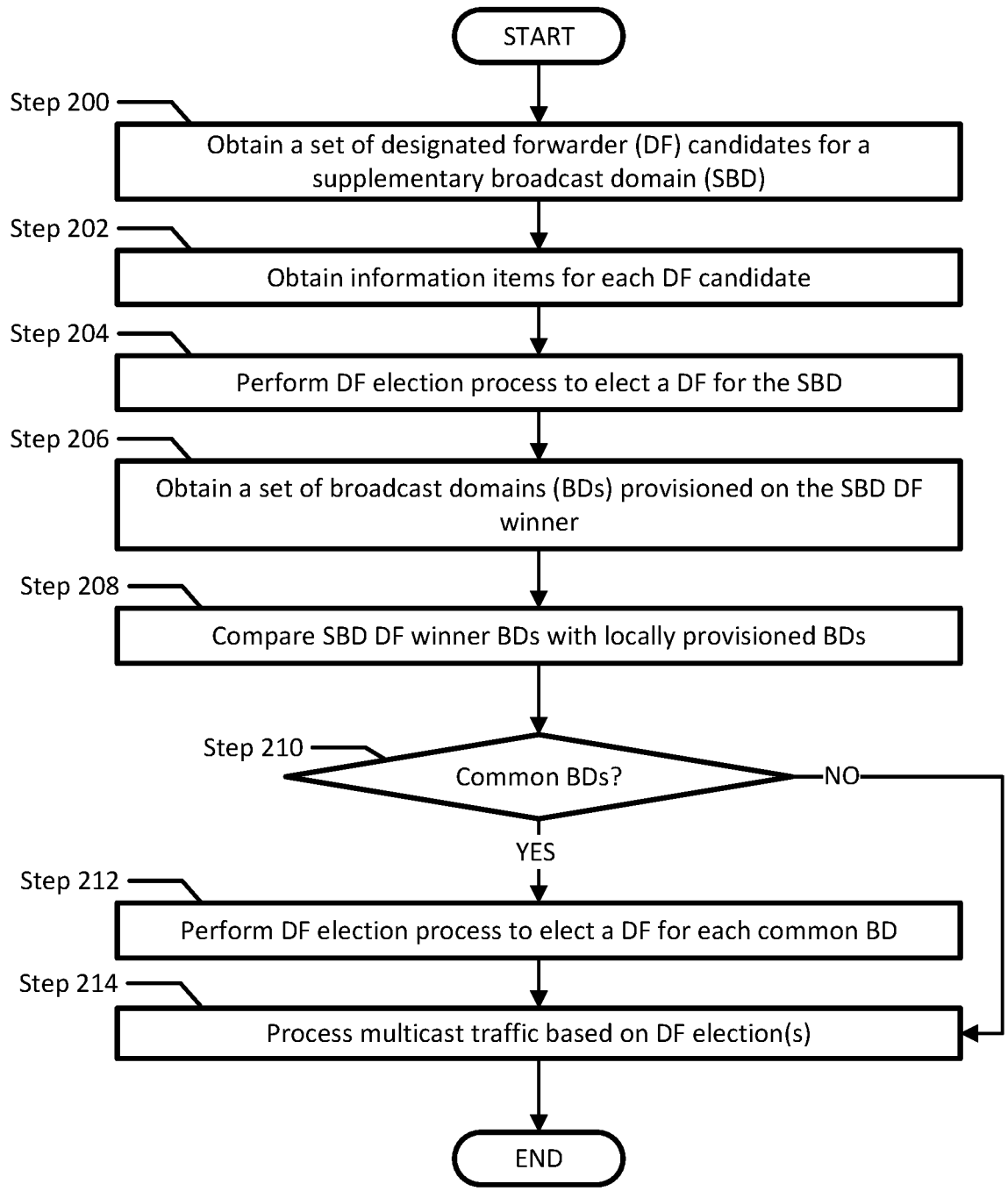
FIG. 2 shows a flowchart in accordance with one or more embodiments described herein.

FIG. 2 shows a flowchart describing a method for performing DF elections in accordance with one or more embodiments described herein. The method for such DF elections shown in FIG. 2 is only one example of a particular scheme for DF election. Accordingly, embodiments described herein should not be considered limited to the explicit DF election process shown in FIG. 2.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, that some or all of the steps may be executed in parallel, and/or that other steps than what is shown in FIG. 2 may be performed.

In Step 200, a DF candidate in a tenant domain obtains a set of DF candidates for a SBD of the tenant domain. In one or more embodiments, the set of DF candidates includes the DF candidate that obtains the set. In one or more embodiments, each DF in a tenant domain is provisioned with the SBD, and the set of DF candidates includes each DF in the tenant domain. In one or more embodiments, the set of DF candidates is obtained using any information sharing scheme configured on and among the DF candidates in a tenant domain. For example, the set of DF candidates may be obtained by information sharing performed pursuant to a border gateway protocol (BGP) neighbor discovery scheme implemented by the network devices of the tenant domain.

In Step 202, a set of one or more information items is obtained for each DF candidate in the set of DF candidates for the SBD that were obtained in Step 200. The information items may be any information item associated with a given DF candidate. For example, each DF candidate may share with the other DF candidates the BDs for which it is provisioned, its IP address, and Ethernet segment identifier (ESI), etc. In one or more embodiments, the information items are sorted per DF candidate in the set of DF candidates. For example, the information items for each DF candidate may be arranged as a tuple, with one tuple per DF candidate. As an example, the tuple may include an identifier of the SBD (e.g., a virtual network identifier (VNI) associated with a VLAN of the SBD), the IP address of the DF candidate, and an ESI.

In Step 204, the DF candidate performs a DF election process to elect a DF for the SBD. In one or more embodiments, the DF election process includes performing any operation on the information items of each DF candidate obtained in Step 202. For example, a hash function may be executed using a tuple for each DF that includes the SBD identifier, the IP address of the DF candidate, and the ESI associated with the DF candidate. In one or more embodiments, the SBD DF winner may be elected using any scheme for selecting one DF candidate using the information items associated with the DF candidate. For example, the DF candidate for which the execution of the hash function yielded the highest (or lowest) result may be elected as the DF winner. In one or more embodiments, each DF candidate in the tenant domain provisioned with the SBD performs the same SBD DF election process. Accordingly, in one or more embodiments, each DF candidate becomes aware of which DF candidate won the SBD DF election process, which may or may not be itself.

In Step 206, a DF obtains a set of BDs that are provisioned on the winner of the SBD DF election in Step 204. In one or more embodiments, the elected SBD DF is provisioned with at least some portion of the BDs of the tenant domain. The set of BDs provisioned on the SBD DF may be shared with other DF candidates in the tenant domain using any scheme for sharing information between network devices. For example, each DF candidate in a tenant domain may implement the boarder gateway protocol (BGP), and via route exchange mechanisms of BGP, share with other network devices, including the other DF candidates, which BDs the DF candidate is provisioned with. Thus, in one or more embodiments, each DF candidate learns which BDs each other DF candidate is provisioned with. In one or more embodiments, after identifying the SBD DF election winner in Step 204, a DF candidate in the tenant domain that did not win the election may use such information to determine the set of BDs that are provisioned on the elected SBD DF.

In Step 208, a DF candidate compares the set of BDs provisioned on the SBD PEG-DR winner with the set of BDs that are locally provisioned on itself. In one or more embodiments, the comparison may be performed using any scheme for comparing two sets of information. In one or more embodiments, the BDs in each set may be identified using any type of identifier of a BD. As an example, a BD may be identified by a VLAN ID. In such a scenario, the DF candidate may perform a comparison between the set of VLAN IDs provisioned on the SBD DF, and the set of BDs that are locally provisioned.

In Step 210, a determination is made as to whether there are any common BDs between the set of BDs provisioned on the SBD DF and the set of BDs provisioned locally on the DF candidate that performed the comparison in Step 208. In one or more embodiments, a common BD is a BD for which both the SBD DF and the DF that performed the comparison are provisioned. For example, if the SBD DF is provisioned with a BD associated with VLAN 27, and the DF that performed the comparison is also provisioned with the BD associated with VLAN 27, then VLAN 27 represents a common BD between the DFs. In one or more embodiments, if there are no common BDs, the method proceeds to Step 214. In one or more embodiments, if there are one or more common BDs, the method proceeds to Step 212.

In Step 212, the DF candidate that identified having one or more common BDs with the SBD DF performs additional DF elections for each common BD. In one or more embodiments, the DF candidate excludes from any DF election process any BDs for which it is provisioned, but for which the SBD DF is not provisioned. In one or more embodiments, the DF candidate determined the DF election winner for each BD it has in common with the SBD DF using a DF election process similar to that described above for the election of the SBD DF in Step 204. As such, in one or more embodiments, on a per common BD basis, obtains a set of information items for each DF candidate provisioned with a given BD, performs an operation (e.g., executes a hash function) using the information items, and identifies the DF election winner for the BD based on the result. In one or more embodiments, the DF candidate performing the additional DF elections may be the DF election winner for any one or more, or none, of the BDs that were identified as being common BDs with the SBD DF.

In Step 214, the DF candidate, and each other DF candidate, after the DF elections, process multicast traffic (e.g., PIM register messages) originating from within the tenant domain and destined for an external multicast domain according to the results of the SBD DF election and the additional DF elections performed by the various DFs. In one or more embodiments, the SBD DF election winner processes multicast traffic (e.g., PIM register messages) by sending the traffic to the external multicast domain for all non-overlapping BDs of the tenant domain. In one or more embodiments, the multicast traffic (e.g., PIM register messages) originating from within any BD that each DF candidate has in common with the SBD DF is processed by the DF winner for that BD. In one or more embodiments, the division of the SBD DF sending multicast traffic (e.g., PIM register messages) for the non-overlapping BDs and the elected DFs for overlapping BDs sending the multicast traffic (e.g., PIM register messages) for those BDs eliminates the possibility that any device, such as a PIM RP, in the external multicast domain receives duplicate multicast traffic (e.g., PIM register messages) that originated from within the tenant domain.

Figure 3:
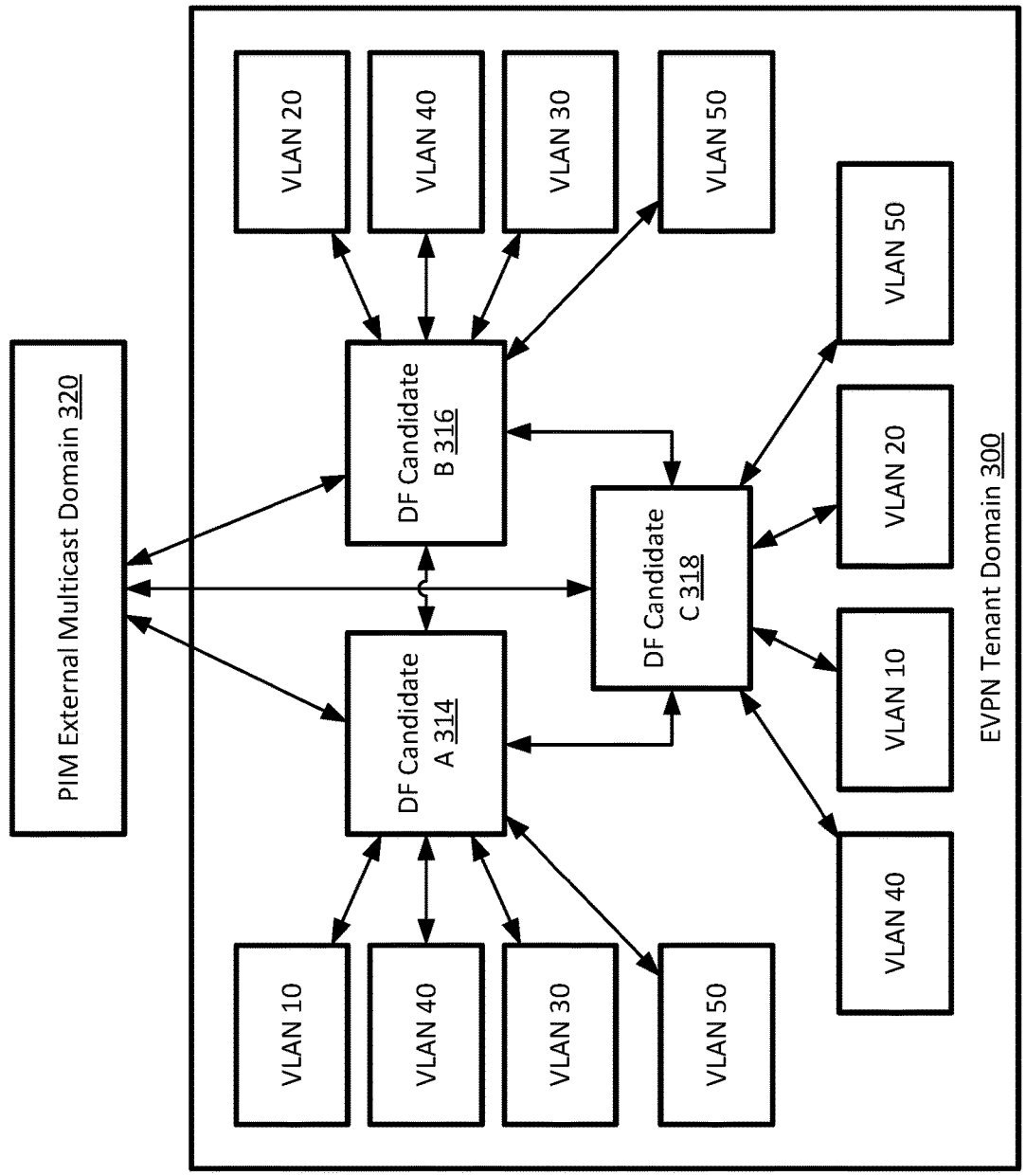
FIG. 3 shows an example in accordance with one or more embodiments described herein.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 3, consider a scenario in which an EVPN tenant domain (300) is operatively connected to a PIM external multicast domain (320). The EVPN tenant domain includes DF candidate A (314), DF candidate B (316) and DF candidate C (318). Each DF candidate is operatively connected to the PIM external multicast domain (320) and, as such, may be a PIM external gateway (PEG) for the EVPN tenant domain (300).

DF candidate A (314) is operatively connected to a segment of a BD associated with VLAN 10, a segment of a BD associated with VLAN 30, a segment of a BD associated with VLAN 40, and a segment of a BD associated with VLAN 50. DF candidate B (316) is operatively connected to a segment of a BD associated with VLAN 20, a segment of a BD associated with VLAN 30, a segment of a BD associated with VLAN 40, and a segment of a BD associated with VLAN 50. DF candidate C (318) is operatively connected to a segment of a BD associated with VLAN 10, a segment of a BD associated with VLAN 20, a segment of a BD associated with VLAN 40, and a segment of a BD associated with VLAN 50.

In such a scenario, as DF candidates in the EVPN tenant domain (300), DF candidate A (314), DF candidate B (316), and DF candidate C (318) are each provisioned with the SBD for the EVPN tenant domain. DF candidate A (314) is also provisioned with the BD associated with VLAN 10 and the BD associated with VLAN 30. DF candidate B (316) is also provisioned with the BD associated with VLAN 20 and the BD associated with VLAN 30. DF candidate C (318) is also provisioned with the BD associated with VLAN 10 and the BD associated with VLAN 20.

Thus, VLAN 10, VLAN 20, and VLAN 30 are non-overlapping BDs of the EVPN tenant domain (300), as they are not common among all of the DF candidates of the EVPN tenant domain (300).

DF candidate A (314) is also operatively connected to and provisioned with a segment of a BD associated with VLAN 40, and a segment of a BD associated with VLAN 50. DF candidate B (316) is also operatively connected to and provisioned with a segment of a BD associated with VLAN 40, and a segment of a BD associated with VLAN 50. DF candidate C (318) is also operatively connected to and provisioned with a segment of a BD associated with VLAN 40, and a segment of a BD associated with VLAN 50.

Therefore, VLAN 40 and VLAN 50 are provisioned on each DF candidate of EVPN tenant domain (300). As such, they are each overlapping BDs within the EVPN tenant domain (300).

When EVPN tenant domain (300) is deployed, the DF candidates (314, 316, 318) share information with one another using route sharing mechanisms of BGP. Therefore, each DF candidate is aware of the VLANs provisioned on each other DF candidate, the set of DF candidates provisioned with the SBD, and the IP addresses associated with each other DF candidate (and itself).

Next, each DF candidate (314, 316, and 318) perform a DF election to determine the SBD winner. To perform the election, each DF candidate creates three tuples. Each tuple includes the VNI associated with the VLAN assigned to the SBD, and an IP address associated with one of the DF candidates. Each DF candidate thus has the same three tuples created for use in the SBD DF election process.

Next, each DF candidate performs the same hash function using each of the three tuples associated with each of the three DF candidates. The DF candidate for which the hash of the tuple resulted in the highest value wins the SBD DF election. In this scenario, the tuple associated with DF candidate C (318) results in the highest hash value. Therefore, each of DF candidate A (314), DF candidate B (316), and DF candidate C (318) determines that DF candidate C (318) is the elected SBD DF.

Next, DF candidate A (314) uses the information items it previously received from DF candidate C (318) (i.e., the SBD DF election winner) to determine the set of BDs provisioned on DF candidate C (318). The set includes BDs associated with VLAN 10, VLAN 20, VLAN 40, and VLAN 50. This set is then compared with the set of BDs provisioned on DF candidate A (314), which includes BDs associated with VLAN 10, VLAN 30, VLAN 40, and VLAN 50. The comparison yields that VLAN 10, VLAN 40, and VLAN 50 are common BDs with DF candidate C (318). VLAN 30 does not overlap with DF candidate C (318). Accordingly, DF candidate A (314) excludes VLAN 30 from any additional DF election processes. DF candidate A (314) does perform a DF election process for VLAN 10, VLAN 40, and VLAN 50. The election results in DF candidate A being elected as the DF for VLAN 10 and VLAN 40.

At the same time, DF candidate B (316) uses the information items it previously received from DF candidate C (318) (i.e., the SBD DF election winner) to determine the set of BDs provisioned on DF candidate C (318). The set includes BDs associated with VLAN 10, VLAN 20, VLAN 40, and VLAN 50. This set is then compared with the set of BDs provisioned on DF candidate B (316), which includes BDs associated with VLAN 20, VLAN 30, VLAN 40, and VLAN 50. The comparison yields that VLAN 20, VLAN 40, and VLAN 50 are common BDs with DF candidate C (318). VLAN 30 does not overlap with DF candidate C (318). Accordingly, DF candidate B (316) excludes VLAN 30 from any additional DF election processes. DF candidate B (316) does perform a DF election process for VLAN 20, VLAN 40, and VLAN 50. The election results in DF candidate A being elected as the DF for VLAN 20 and VLAN 50. DF candidate C (318) (i.e., the SBD DF) is not provisioned for VLAN 30, so it also does not perform a DF election process for VLAN 30.

At this point, the DF for VLAN 10 is DF candidate A (314). The DF for VLAN 20 is DF candidate B (316). The DF for VLAN 40 is DF candidate A (314). The DF for VLAN 50 is DF candidate B (316). And, because neither DF candidate A (314), nor DF candidate B (316), or the SBD DF, performed a DF election process for VLAN 30, as it was not overlapping with the SBD DF, DF candidate C (318), the SBD DF, becomes the de facto DF for VLAN 30.

Based on the above-described results, when multicast traffic (e.g., PIM register messages) originating from within VLAN 10 and/or VLAN 40 is destined for PIM external multicast domain (320), DF candidate A (314) acts as the DF for the multicast traffic (e.g., PIM register messages). When multicast traffic (e.g., PIM register messages) originating from within VLAN 20 and/or VLAN 50 is destined for PIM external multicast domain (320), DF candidate B (316) acts as the DF for the multicast traffic (e.g., PIM register messages). When multicast traffic (e.g., PIM register messages) originating from VLAN 30 is destined for PIM external multicast domain (320), the SBD DF, DF candidate C (318) acts as the DF for the multicast traffic (e.g., PIM register messages). Thus, each BD associated with each of the five VLANs in EVPN tenant domain (300) has one, and only one, DF forwarding multicast traffic (e.g., PIM register messages) to PIM external multicast domain (320), and duplicate multicast traffic (e.g., PIM register messages) from EVPN tenant domain (300) is avoided.

In the above description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While a limited number of embodiments have been described herein, those skilled in the art, having benefit of this disclosure, will appreciate that other embodiments can be devised which do not depart from the scope of the embodiments described herein. Accordingly, the scope of embodiments described herein should be limited only by the attached claims.

What is claimed is:

1. A method for designated forwarder (DF) elections among a plurality of DF candidates in an EVPN network, the method comprising:
    obtaining, by a DF candidate that is provisioned with a supplementary broadcast domain (SBD) of a tenant domain, the plurality of DF candidates that are provisioned with the SBD, wherein the DF candidate is one of the plurality of DF candidates for the SBD;
    performing, by the DF candidate, a SBD DF election process to determine an SBD DF winner from among the plurality of DF candidates;
    making a first determination, by the DF candidate, that the DF candidate is not the SBD DF winner;
    making, by the DF candidate and based on the first determination, a second determination that a first broadcast domain (BD) of a plurality of BDs provisioned on the DF candidate is not provisioned on the SBD DF winner;
    excluding, by the DF candidate and based on the second determination, the first BD from a set of BDs of the plurality of BDs that are also provisioned on the SBD DF winner;
    performing, by the DF candidate and after the excluding, additional DF election processes for each BD of the set of BDs; and
    processing multicast traffic based at least in part on the SBD DF election process and the additional DF election processes, wherein the multicast traffic is destined for an external multicast domain,
    wherein the DF candidate and the SBD DF winner are provider edge (PE) routers of an Ethernet virtual private network (EVPN) instance (EVI) that are configured as external gateways.

2. The method of claim 1, wherein processing multicast traffic comprises:
    receiving, by the DF candidate, multicast traffic associated with the first BD; and
    dropping, by the DF candidate, the multicast traffic associated with the first BD.

3. The method of claim 2, wherein the multicast traffic associated with the first BD is forwarded to the external multicast domain by the SBD DF winner.

4. The method of claim 1, wherein performing the additional DF election processes results in the DF candidate becoming a BD DF winner for a second BD of the set of BDs that are also provisioned on the SBD DF winner.

5. The method of claim 4, wherein processing multicast traffic comprises:
    receiving, by the DF, multicast traffic associated with the second BD; and
    forwarding, to the external multicast domain, by the DF candidate, the multicast traffic based on the DF candidate being the BD DF winner.

6. The method of claim 1, wherein each BD of the plurality of BDs is associated with a virtual local area network (VLAN) identifier.

7. The method of claim 1, wherein the SBD DF election process comprises:
    executing a hash function on a unique set of DF candidate information items for each of the plurality of DF candidates; and
    electing the SBD DF winner based on results obtained by executing the hash function on each unique set of DF candidate information.

8. A non-transitory computer readable medium comprising computer readable program code, which when executed by a computer processor enables the computer processor to perform a method for designated forwarder (DF) elections, the method comprising:
    obtaining, by a DF candidate that is part of a supplementary broadcast domain (SBD) of a tenant domain, a plurality of DF candidates that are part of the SBD, wherein the DF candidate is one of the plurality of DF candidates for the SBD;
    performing, by the DF candidate, a SBD DF election process to determine an SBD DF winner from among the plurality of DF candidates;
    making a first determination, by the DF candidate, that the DF candidate is not the SBD DF winner;
    making, by the DF candidate and based on the first determination, a second determination that a first broadcast domain (BD) of a plurality of BDs provisioned on the DF candidate is not provisioned on the SBD DF winner;
    excluding, by the DF candidate and based on the second determination, the first BD from a set of BDs of the plurality of BDs that are also provisioned on the SBD DF winner;
    performing, by the DF candidate and after the excluding, additional DF election processes for each BD of the set of BDs; and
    processing multicast traffic based at least in part on the SBD DF election process and the additional DF election processes, wherein the multicast traffic is destined for an external multicast domain.

9. The non-transitory computer readable medium of claim 8, wherein processing multicast traffic comprises:
receiving, by the DF candidate, multicast traffic associated with the first BD; and
dropping, by the DF candidate, the multicast traffic associated with the first BD.

10. The non-transitory computer readable medium of claim 9, wherein the multicast traffic associated with the first BD is forwarded to the external multicast domain by the SBD DF winner.

11. The non-transitory computer readable medium of claim 8, wherein performing the additional DF election processes results in the DF candidate becoming a second BD DF winner for a second BD of the set of BDs that are also provisioned on the SBD DF winner.

12. The non-transitory computer readable medium of claim 11, wherein processing multicast traffic comprises:
receiving, by the DF, multicast traffic associated with the second BD; and
forwarding, to the external multicast domain, by the DF candidate, the multicast traffic based on the DF candidate being the second BD DF winner.

13. The non-transitory computer readable medium of claim 8, wherein the DF candidate and the SBD DF winner are provider edge (PE) routers of an Ethernet virtual private network (EVPN) instance (EVI) that are configured as external gateways.

14. The non-transitory computer readable medium of claim 8, wherein the SBD DF election process comprises:
executing a hash function on a unique set of DF candidate information items for each of the plurality of DF candidates; and
electing the SBD DF winner based on results obtained by executing the hash function on each unique set of DF candidate information.

15. A system for designated forwarder (DF) elections, the system comprising:
a tenant domain comprising a plurality of broadcast domains (BDs) and a plurality of DF candidates, each provisioned with a supplementary broadcast domain (SBD); and
a DF candidate of the plurality of DF candidates, comprising a processor, memory, and a storage device, and configured to:
obtain the plurality of DF candidates that are part of the SBD, wherein the DF candidate is one of the plurality of DF candidates for the SBD;
perform a SBD DF election process to determine an SBD DF winner from among the plurality of DF candidates;
make a first determination that the DF candidate is not the SBD DF winner;
make, based on the first determination, a second determination that a first broadcast domain (BD) of a plurality of BDs provisioned on the DF candidate is not provisioned on the SBD DF winner;
exclude, based on the second determination, the first BD from a set of BDs of the plurality of BDs that are also provisioned on the SBD DF winner;
perform, after excluding the first BD, additional DF election processes for each BD of the set of BDs; and
process multicast traffic based at least in part on the SBD DF election process and the additional DF election processes, wherein the multicast traffic is destined for an external multicast domain.

16. The system of claim 15, wherein to process the multicast traffic the DF candidate is further configured to:
receive, by the DF candidate, multicast traffic associated with the first BD; and
drop, by the DF candidate, the multicast traffic associated with the first BD.

17. The system of claim 16, wherein the multicast traffic associated with the first BD is forwarded to the external multicast domain by the SBD DF winner.

18. The system of claim 15, wherein performing the additional DF election processes results in the DF candidate becoming a second BD DF winner for a second BD of the set of BDs that are also provisioned on the SBD DF winner.

19. The system of claim 18, wherein, to process the multicast traffic the DF candidate is further configured to:
receive multicast traffic associated with the second BD; and
forward, to the external multicast domain, the multicast traffic based on the DF candidate being the second BD DF winner.

20. The system of claim 15, wherein the DF candidate and the SBD DF winner are provider edge (PE) routers of an Ethernet virtual private network (EVPN) instance (EVI) that are configured as external gateways.

* * * * *